J. J. CARROLL.
Cooking Utensil.
No. 104,422.                    Patented June 21, 1870.
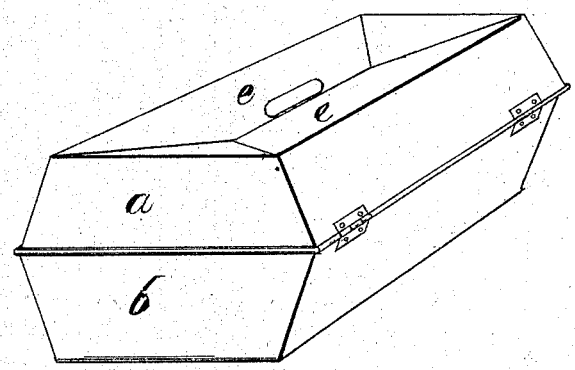
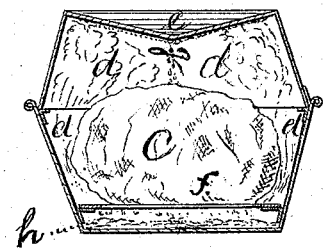

UNITED STATES PATENT OFFICE.

JOHN J. CARROLL, OF WASHINGTON, DISTRICT OF COLUMBIA.

IMPROVED DEVICE FOR ROASTING AND BAKING.

Specification forming part of Letters Patent No. 104,422, dated June 21, 1870.

*To all whom it may concern:*

Be it known that I, JOHN J. CARROLL, of the city and county of Washington, District of Columbia, have invented a new and useful Improvement in Cooking Utensils for Roasting Meats, Poultry, &c.; and I do hereby declare that the following is a full, clear, and correct description thereof, reference being had to the accompanying drawings and the letters of reference marked thereon like letters designating like parts in all the figures.

Figure 1 represents a perspective view, and Fig. 2 a transverse vertical section.

The nature of my invention consists in placing inside a pan a rack or grate, on which the meat to be roasted is placed, and the said pan to have a cover, in the top of which is a depression, which may be made so as to form an obtuse angle or a concave surface, the object of which will be hereinafter fully explained.

To enable those skilled in the art to make and use my invention, I will proceed to describe its construction and operation.

In the drawings, $b$ represents a pan, which may be of any desired form. Inside of this pan, a short distance above the bottom, is a rack or grate, $f$, on which the meat to be roasted is placed.

$a$ is a cover, the sides and ends of which may be inclined or vertical. The top $e$ of this cover is depressed in the form of an obtuse angle, with its apex pointing downward; or its upper surface may be concave, thus forming a cavity to hold water. It may be attached to the pan $b$ by a hinge, or in any other convenient manner, if desired.

Its operation is as follows: The meat or poultry to be roasted is placed on the rack $f$, and some water poured into the pan. The cover $a$ is then placed on the pan and water put into the depression $e$ in its top, and the whole placed in a hot oven. As the water in the bottom of the pan becomes heated, steam will be generated and rise up to the inner side of the cover $a$, and the water in the depression $e$ will cause the steam $d$ to condense, and it then falls down onto the meat $c$, as shown by letter $g$, Fig. 2, thus performing the operation of what is usually termed "basting." Meats roasted in this manner are much more tender and juicy, and, as a matter of course, better than those roasted in the usual manner.

I am aware that a metal cover with cylindrical sides and top in shape of an inverted cone has been used in connection with a cooking-vessel, and this of itself is not my invention; but

What I claim, and desire to secure by Letters Patent, is—

The cooking-vessel herein described, consisting of pan $b$, rack $f$, and cover $a$, with its depressed or concave top $c$, all combined and arranged as and for the purpose set forth.

JOHN J. CARROLL.

Witnesses:
 THEO. F. SARGENT,
 C. S. MORRISON.